UNITED STATES PATENT OFFICE.

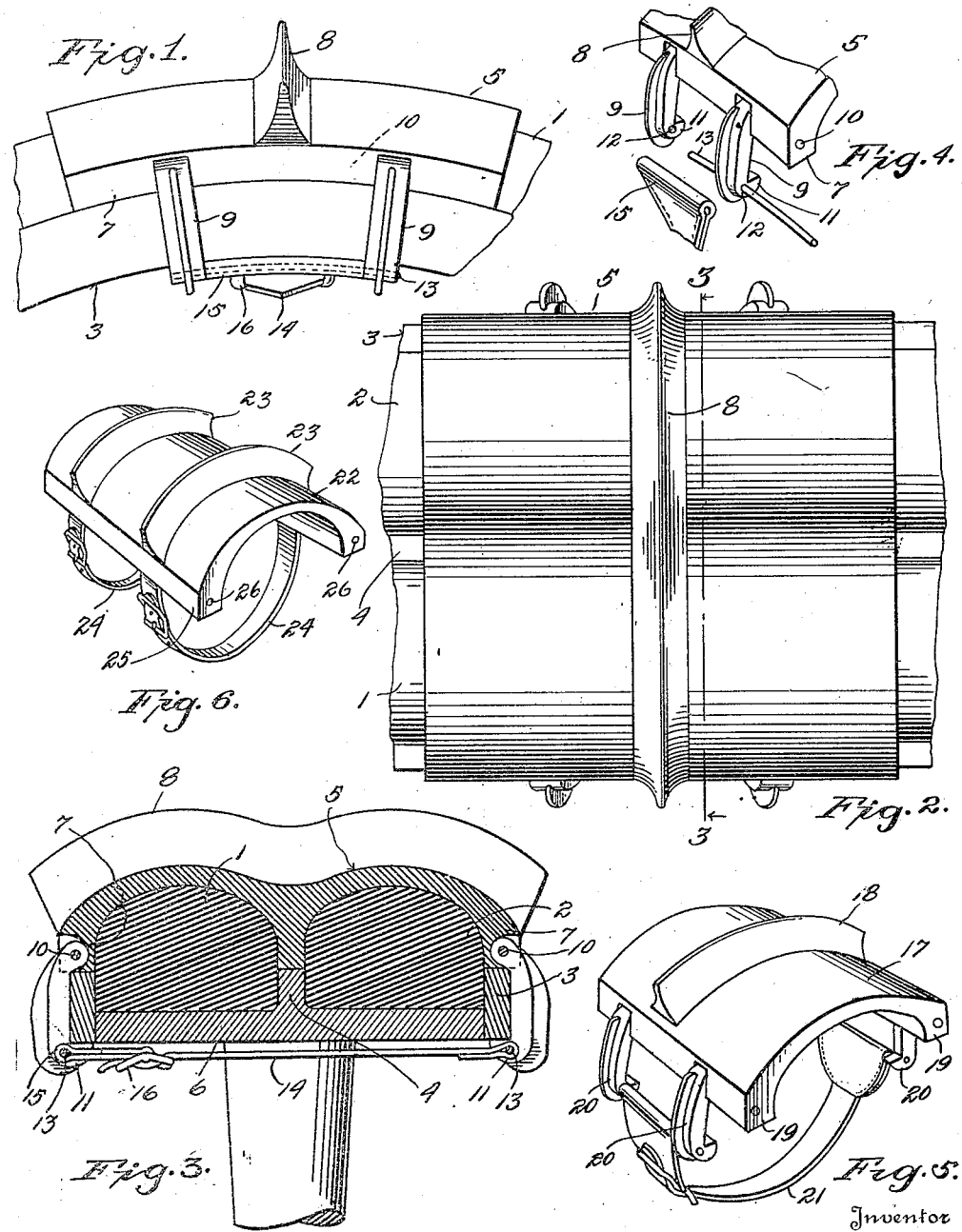

WILLIAM J. HOWARD, OF SEATTLE, WASHINGTON.

TIRE-TREAD FOR VEHICLES.

1,178,074.  Specification of Letters Patent.  Patented Apr. 4, 1916.

Application filed February 24, 1915. Serial No. 10,342.

*To all whom it may concern:*

Be it known that I, WILLIAM J. HOWARD, a citizen of the United States, residing at Seattle, in the county of King, State of Washington, have invented certain new and useful Improvements in Tire-Treads for Vehicles; and I do hereby declare the following to be a full, clear, and exact description of the invention, such as will enable others skilled in the art to which it appertains to make and use the same.

This invention relates to a tire tread for vehicles.

An object of the invention resides in the provision of a device which may be readily attached to a vehicle wheel to cause the wheel to grip the ground to lift the vehicle from a rut or muddy portion of a road.

A further object of the invention resides in so constructing the device that it will bridge the tire and be supported by the rim so that it will be rigid with relation to the rim.

A still further object of the invention resides in so constructing the device that it will be positively maintained on the wheel by means engaging the rim and so that supplemental locking means are provided.

With these and other objects in view, such as will appear as the description progresses, my invention comprises the combination and arrangement of parts as set forth in and falling within the scope of the appended claim.

Referring to the drawing: Figure 1 is a side elevation of one of my devices, showing the same in place upon a truck wheel, only a portion of the wheel being shown. Fig. 2 is a plan view of the same. Fig. 3 is a transverse sectional view taken on line 3—3 of Fig. 2, showing the clamping means for the tread plate. Fig. 4 is a fragmental detail, showing the manner in which the strap may be detached from the latches. Fig. 5 is a perspective view of a modification of my device. Fig. 6 is a perspective of another modification of my device.

Referring to the drawing wherein like parts are indicated by like characters throughout the several views:

Referring to Figs. 1 to 4, inclusive, I have illustrated a wheel such as used on a heavy truck wherein two resilient tires 1 and 2 are mounted on a rim 3 which is provided with a rib 4 extending between the tires 1 and 2. The form of my device shown in Figs. 1 to 4, inclusive, includes a tread plate 5 which is formed so that it will conform to the contour of the tires 1 and 2 and has a tongue 6 extending down between the tires and resting upon the rib 4 of the rim 3. The outer edges of this tread plate 5 are likewise formed into tongues 7 which rest upon the upturned edges of the rim 3. This tread plate 5 is provided with a transversely extending rib 8, the forward and rear faces of which are concaved as clearly shown in Fig. 1 of the drawing. In order that this tread plate may be maintained on the rim 3, I have pivoted to the tongues 7 latches 9 by means of pins 10 extending longitudinally through the tongues and through the ends of the latches. These latches are provided with hooks 11 on their free ends which are adapted to extend around the edges of the rim 3 and to engage the inner face of the said rim. The outer plate will thus be maintained upon the wheel by these latches. In order that the latches may be prevented from accidentally disengaging the rim, I have provided them with holes 12 through which pins 13 extend and from which they are removable. A strap 14 is secured to the pin 13 at one side of the tread plate and is adapted to extend around the rim and to be secured to the pin 13 on the other side of the plate. This latter pin 13 extends through a loop 15 in the end of the strap. The strap is made in sections, secured together by a buckle 16, so that the length thereof may be varied. When the device is in place upon a wheel, as shown in the drawing, the strap 14 will maintain the latches 9 in engagement with the rim and these latches will maintain the tread plate in position bridging the tire and so that the tongues 6 and 7 will bear against the rim 3.

In the embodiment of my invention shown in Fig. 5, I have shown a construction which is used on a light truck wheel where but a single tire is mounted on the rim. In this embodiment there is shown an arched tread plate 17 having a transversely extending rib 18, the faces of which are concaved. This plate is provided with tongues 19 which rest upon the outer edges of the rim. Latch members 20 are provided which are pivoted to the tongues 19 in a manner similar to that in which the latch members 9, of the form shown in Figs. 1 to 4, are pivoted to the tongue of the tread plate. These latch members 20 are maintained on the rim by a strap 21 similar to the strap 14 and secured to the latch members in a similar manner.

In the embodiment of my invention shown in Fig. 6 I have provided a plate 22 of arched formation having ribs 23 extending transversely thereacross. This form is to be used in connection with a lighter vehicle such as a passenger carrying car. In this form I have omitted the latching members and have secured straps 24 to the tongues 25 by means of pins 26 extending through the tongues and through loops in the ends of the straps.

In the form shown in Figs. 1 to 5 inclusive the strap may be disengaged by the removal of the pin from the latching members and the device thus removed. This will obviate the necessity for unbuckling the sections of the strap each time the device is to be placed upon a wheel, the buckle being provided merely for adjusting the strap to a particular wheel. Thus when it is desired to place the device upon a wheel to lift the vehicle out of a rut, for instance, the tread plate is placed upon the wheel and the strap passed about the rim. The pin is then passed through the loop in the end of the strap and through the latching members.

In the embodiment of the device shown in Fig. 6 the tread plate may be removed by the unbuckling of the straps.

From the foregoing description it will be seen that I have provided a device which will be readily attachable to a vehicle wheel and by means of which the vehicle wheel may be lifted out of a rut.

I have so constructed the device that it will rest upon the rim of the wheel and thus the rib will be positively pushed into the ground because of the rigid relationship between the wheel and the device, and furthermore the pressure will be taken off of the tire.

While I have illustrated and described a particular embodiment of my invention I have merely done so for the sake of convenience and I do not wish to be limited to that particular embodiment as it is obvious that numerous changes may be made in the details of construction thereof without in any way departing from the spirit of the invention or exceeding the scope of the appended claim.

What I claim is:—

In a tire tread, a plate adapted to bridge a tire, hook-shaped latching members secured to the opposite sides of said plate and arranged in pairs, pins extending between and detachably engaged with the members of said pairs, a strap extending between the pairs on the opposite sides of the plate and detachably engaged with said pins, and means for varying the length of said strap.

In testimony whereof, I affix my signature, in the presence of two witnesses.

WILLIAM J. HOWARD.

Witnesses:
 JOHN DUDMAN,
 ROBT. G. HABERKORN.